(12) United States Patent
Chandrasekaran et al.

(10) Patent No.: US 12,511,204 B2
(45) Date of Patent: Dec. 30, 2025

(54) METHOD AND SYSTEM FOR MANAGING GEO-REDUNDANT CLOUD SERVERS IN COMMUNICATION SYSTEMS

(71) Applicant: Samsung Electronics Co., Ltd., Suwon-si (KR)

(72) Inventors: Ganesh Chandrasekaran, Bangalore (IN); Sunil N, Bangalore (IN); Talakala Grace Hanusha, Bangalore (IN); Saurabh Swaraj, Bangalore (IN); Rajesh Challa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/639,364

(22) Filed: Apr. 18, 2024

(65) Prior Publication Data
US 2025/0004891 A1    Jan. 2, 2025

Related U.S. Application Data

(63) Continuation of application No. PCT/KR2024/095211, filed on Feb. 15, 2024.

(30) Foreign Application Priority Data

Jun. 30, 2023   (IN) .............................. 202341044185

(51) Int. Cl.
*G06F 11/20* (2006.01)
*G06F 11/14* (2006.01)

(52) U.S. Cl.
CPC ...... *G06F 11/2074* (2013.01); *G06F 11/1451* (2013.01); *G06F 11/1464* (2013.01); *G06F 11/2097* (2013.01); *G06F 2201/82* (2013.01)

(58) Field of Classification Search
CPC ............ G06F 11/1451; G06F 11/1464; G06F 11/2074; G06F 11/2097; G06F 2201/82;
(Continued)

(56) References Cited

U.S. PATENT DOCUMENTS 7,693,880 B1 *   4/2010   Ranade ................. G06F 16/184
                                                       707/999.203
10,346,252 B1   7/2019   Gould et al.
(Continued)

FOREIGN PATENT DOCUMENTS

CN            113835930         12/2021
EP            3116163 B1        6/2019
(Continued)

OTHER PUBLICATIONS

Search Report and Written Opinion dated May 24, 2024 issued in International Patent Application No. PCT/KR2024/095211.

*Primary Examiner* — Marc Duncan
*Assistant Examiner* — Albert Li
(74) *Attorney, Agent, or Firm* — Nixon & Vanderhye P.C.

(57) ABSTRACT

Embodiments of the present disclosure disclose a method and a system for managing geo-redundant cloud servers. The method includes: receiving, by a set of first geo-redundant operators associated with a set of first databases hosted on a set of first servers of a first data system, state information of corresponding first server of the set of first servers, health information of a set of second servers of a second data system, from a corresponding first manager of a set of first managers associated with the set of first servers. The method includes synchronizing, by the set of first geo-redundant operators, stateful data from each first database of the set of first databases to a corresponding second database of a set of second databases associated with the set of second servers (Continued)

based on the state information, the health information and one or more synchronization parameters.

18 Claims, 8 Drawing Sheets

(58) Field of Classification Search
CPC .... G06F 16/27; G06F 16/273; G06F 11/1658; G06F 11/2082
See application file for complete search history.

(56) References Cited

U.S. PATENT DOCUMENTS

| | | | |
|---|---|---|---|
| 10,754,741 B1* | 8/2020 | Sethuramalingam | ............................ G06F 11/203 |
| 10,805,361 B2 | 10/2020 | Sheng et al. | |
| 10,983,881 B2 | 4/2021 | Salapura et al. | |
| 11,663,096 B1* | 5/2023 | Sharma | .................... G06F 3/06 714/4.11 |
| 11,770,447 B2 | 9/2023 | Joseph et al. | |
| 2005/0015407 A1* | 1/2005 | Nguyen | .............. G06F 11/2069 |
| 2006/0271812 A1 | 11/2006 | Horton et al. | |
| 2007/0022263 A1* | 1/2007 | Fandel | ................ G06F 11/2074 711/162 |
| 2013/0212205 A1 | 8/2013 | Flockhart et al. | |
| 2014/0018064 A1 | 1/2014 | Taglienti et al. | |
| 2017/0214550 A1* | 7/2017 | Kumar | ................ H04L 41/5045 |
| 2019/0303490 A1* | 10/2019 | Chen | .................... G06F 11/1464 |
| 2020/0348927 A1* | 11/2020 | Landman | .................... G06F 8/71 |
| 2023/0336621 A1* | 10/2023 | Haserodt | ............. H04L 41/0663 |
| 2025/0199872 A1* | 6/2025 | Bhattacharyya | ........ H04L 43/10 |

FOREIGN PATENT DOCUMENTS

| | | |
|---|---|---|
| EP | 4060502 | 9/2022 |
| WO | 2011/034785 | 3/2011 |

* cited by examiner

METHOD AND SYSTEM FOR MANAGING GEO-REDUNDANT CLOUD SERVERS IN COMMUNICATION SYSTEMS

CROSS-REFERENCE TO RELATED APPLICATIONS

This application is a continuation of International Application No. PCT/KR2024/095211 designating the United States, filed on Feb. 15, 2024, in the Korean Intellectual Property Receiving Office and claiming priority to Indian Provisional Patent Application No. 202341044185, filed on Jun. 30, 2023, in the Indian Patent Office, and to Indian Complete patent application Ser. No. 202341044185, filed on Nov. 29, 2023, in the Indian Patent Office, the disclosures of each of which are incorporated by reference herein in their entireties.

BACKGROUND

Field

The disclosure relates to communication networks, and for example, to a method and system for managing geo-redundant cloud servers in communication systems.

Description of Related Art

With 5G expansion, there is a rise in complicated network configurations due to the integration of existing and new technologies, examples include 5G and LTE in co-existence or the need to simultaneously manage physical and Virtualized Network Functions (VNFs) or containerized network functions (CNFs). Typically, 4G/5G radio and core networks include VNF(s)/CNF(s) and cloud orchestrator manages the End-to-End (E2E) orchestration and lifecycle of the CNF(s)/VNF(s). Cloud orchestrator (CO) comprises of set of distributed cloud native micro services, which can be stateful or stateless. If disaster (natural disaster, data corrupt etc.) occurs at location where CO is deployed, then that CO is not usable until it is manually recovered. To recover CO from disasters, operators will usually maintain two or many COs, with same configurations and resources. The CO which actively manages the VNF(s)/CNF(s) is referred to as Operational (OP) site and the other redundant sites are referred to as geo-redundant sites or Disaster Recovery (DR) sites herein.

Conventionally, a load balancer is used to divert traffic between the OP site and DR site based on health condition of the OP site. More specifically, the load balancer switches from the OP site to the DR site instantaneously on identifying a disaster in at least one network component. In general, the OP site has a plurality of servers implementing different network functions/components, for example, Element Management System (EMS), Operational Support System (OSS), Business Support System (BSS), Network Slice Subnet Management Function (NSSMF), Network Slice Management Function (NSMF), etc. When one of the network component such as, a server implementing functions of NSMF in the OP site fails, then the load balancer completely shifts operations to the DR site even though other servers implementing other network functions in the OP site are operating normally. This happens due to a tight coupling between various servers implementing the various network functions in the OP site/DR site. For example, if one of the server is corrupted, for example, EMS is corrupted, the load balancer completely switches operations from the OP site to the DR site. Also, the cloud orchestrator at the DR site is same as the OP site and is not used efficiently. More specifically, the DR site cannot be used for compute load-sharing or geographic load-sharing as they are geo-redundancy unaware. Hence, this results in a significant resource wastage in maintaining the DR site.

Moreover, with expansion of 5G, there has been ability to rapidly launch new services and easily upgrade existing services according to the impact of market demand. As such, cloud native micro services in the OP site and the DR site differ. For example, any set of micro-services not running on the DR site cannot be detected unless manually checked on the DR site. In such cases, the differences in cloud native micro services need to be manually identified and then upgraded to install, delete or update micro-services in CO. In general, the cloud native micro services need to be updated manually on both the sites (e.g., DR site and the OP site) to eliminate any version mismatch during data sync which is cumbersome and time consuming. In addition, the unified sync is performed for different type of stateful data between OP and DR sites. In other words, there are no options to filter or restrict certain type of data for syncing between the OP site and the DR site.

In view of the above, there exists a need for efficient management of geo-redundant cloud orchestrators in cloud-native deployment.

The information disclosed in this background of the disclosure section is simply for enhancement of understanding of general background and should not be taken as an acknowledgement or any form of suggestion that this information forms the prior art already known to one skilled in the art.

SUMMARY

In an example embodiment, a method for managing geo-redundant cloud servers is disclosed. The method includes: receiving, by at least one first geo-redundant operator associated with at least one first server, state information of the at least one first server, health information of a corresponding at least one second server; synchronizing, by the at least one first geo-redundant operator, stateful data from at least one first database associated with the at least one first server to a corresponding second database associated with the at least one second server based on the state information, the health information and one or more synchronization parameters.

In an example embodiment, a first geo-redundant operator for managing geo-redundant cloud servers is disclosed. The first geo-redundant operator includes: a communication interface comprising circuitry, a memory, and at least one processor, comprising processing circuitry, wherein the communication interface is communicably coupled to a first manager associated with at least one first server and at least one first database hosted on the at least one first server; the memory is configured to store instructions and the at least one processor is communicably coupled to the communication interface and the memory. At least one processor, individually and/or collectively, is configured to: receive state information of the at least one first server, health information of a corresponding second server from the first manager; synchronize stateful data from the at least one first database to a corresponding second database associated with the corresponding second server based on the state information, the health information and one or more synchronization parameters.

In an example embodiment, a method performed by a first geo-redundant operator in a first cloud orchestrator, for managing geo-redundant cloud servers, may comprise receiving state information of a first server associated with a microservice in the first cloud orchestrator and health information of a second server associated with the microservice in a second cloud orchestrator. The method may comprise synchronizing stateful data from a first database associated with the first server to a second database associated with the second server based on the state information, the health information, and one or more synchronization parameters. The state information may indicate an operational server from among the operational server and a geo-redundant server.

The foregoing summary is illustrative and is not intended to be in any way limiting. In addition to the illustrative aspects, embodiments, and features described above, further aspects, embodiments, and features will become apparent with reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 1A:
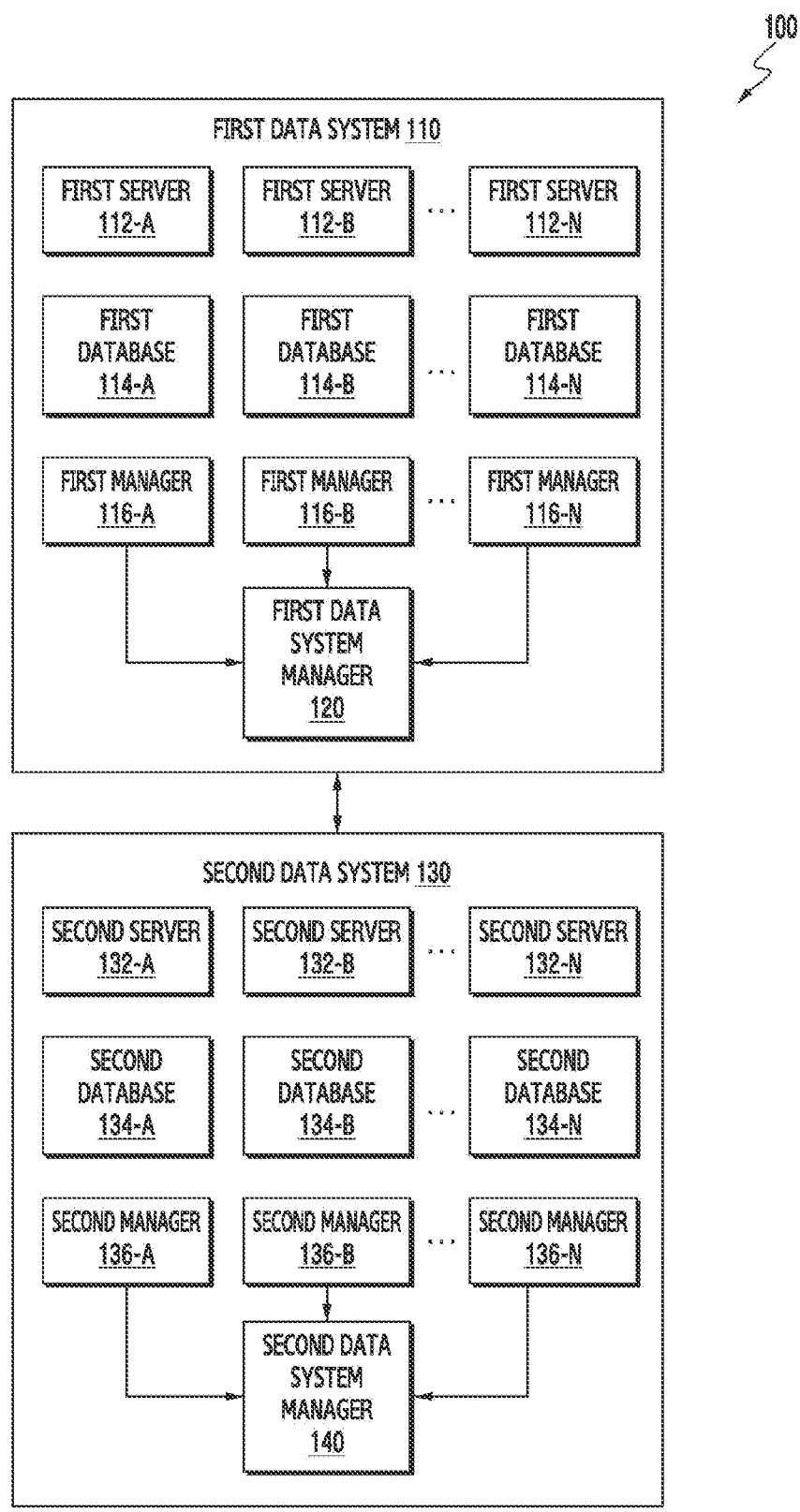
FIG. 1A is a block diagram illustrating an example configuration of cloud orchestration in a cloud-native deployment according to various embodiments.

It should be appreciated by those skilled in the art that any block diagrams herein represent conceptual views of illustrative systems embodying various principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present disclosure, the word "exemplary" is used herein to refer, for example, to "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, various example embodiments thereof are shown by way of example in the drawings and will be described in greater detail below. It should be understood, however that it is not intended to limit the disclosure to the particular forms disclosed, but on the contrary, the disclosure is intended to cover all modifications, equivalents, and alternatives falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration various example embodiments in which the disclosure may be practiced. It is to be understood that changes may be made without departing from the scope of the present disclosure. The following description is, therefore, not to be taken in a limiting sense.

It is noted that, for convenience of explanation, the disclosure uses terms and names defined in the 3rd Generation Partnership Project Radio Access Network (3GPP RAN) standards and in the absence of any specific interpretation or explanation provided herein such terms are to be understood as specified by the 3GPP RAN standards.

The term 'cloud orchestration' as used herein may refer, for example, to the process of coordinating tools, applications, application programming interfaces (APIs), and infrastructure across private and public clouds into comprehensive workflows. For example, cloud orchestration is an automated process to deploy, configure, integrate & manage containers (e.g., VNF(s)/CNF(s)) and microservices of a 5G system. It is noted that the cloud orchestration is not only performed on containers and applications/microservices but also on IT systems, and network elements. As such, cloud orchestrator includes a set of distributed cloud native micro services, which can be stateful (e.g., have a state) or stateless (e.g., have no state). In this disclosure, cloud orchestration is done in a cloud-native deployment and are geo-redundancy aware which is explained in detail with reference to FIGS. 1A-6.

FIG. 1A is a block diagram illustrating an example configuration of cloud orchestration in a cloud-native deployment of a wireless communication system 100 according to various embodiments. The wireless communication system 100 illustrates synchronization of stateful data between a first data system 110 and a second data system 130. The term "synchronization" as used herein may refer, for example, to transferring of the stateful data from the first data system 110 to the second data system 130 such that the stateful data remain identical in both the first data system 110 and the second data system 130. The term 'stateful data' as used herein refers to user data, UE state information and session data that is stored permanently in a network function such as, Unified Data Repository (UDR). For example, when an application/microservice is stateful, client data is either stored locally or on a remote host until the user logs out or the session expires after a predetermined time limit. This session data that is saved is accessible to the other network functions (CNFs/VNFs), to the client and to other applications in the 5G system. Some examples of the stateful data include, but not limited to, relational database, time series database, file type storage, block type storage, object type storage, and the like.

The first data system 110 includes at least one first server. In this example representation the at least one first server is represented by a set of first servers 112-A, 112-B, . . . 112-N (hereinafter referred to as "at least one first server 112-A, 112-B, . . . 112-N" and "set of first servers 112-A, 112-B, . . . 112-N" interchangeably). It is noted that although set of first servers 112-A, 112-B, . . . 112-N have been shown, the first data system 110 may also include only one first server (e.g., first server 112-A). Each server of the set of first servers 112-A, 112-B, . . . 112-N may refer to microservices or containers that enable virtualization at an operating system level. For example, the containers may refer to CNFs/VNFs of the 5G system. For example, the first server 112-A may refer to an Element Management System (EMS), the first server 112-B may refer to a router, etc. In general, the set of first servers 112-A, 112-B, . . . 112-N manage specific types of one or more network elements and communication between the network elements of 5G. The containers referred to as 'set of first servers' appear as unique servers from the standpoint of an end user that communicates with the containers. However, it is noted that from the standpoint of an operating system, the containers may be user processes that are scheduled and dispatched by the operating system. In other examples, each container may be executed on a virtual machine or each container may be executed on a separate server as described herein.

In an embodiment, the at least one first server hosts at least one first database. Accordingly, it is noted that a first server may host more than one first database. In this example representation shown in FIG. 1A, the set of first servers 112-A, 112-B, . . . 112-N host a set of first databases 114-A, 114-B, . . . , 114N. For example, each of the first server hosts a first database. It is noted that a first server may be associated with more than one first database and embodiments of the disclosure may be implemented in such arrangements for synchronizing stateful data between the first data system 110 and the second data system 130.

In this example representation, each of the first servers of the set of first servers 112-A, 112-B, . . . 112-N may be associated with a first database. For example, the first server 112-A is associated with the first database 114-A, the first server 112-B is associated with the first database 114-B, and so on. Some examples of the set of first databases 114-A, 114-B, . . . , 114-N include, but not limited to, registry, relational database, NoSQL database, Graph database, time-series based database, minio, chartmuseum, Persistent Volume (PV), application database, and the like. Registry is configured to store a plurality of docker images in layered fashion. The NoSQL data, graph data, time-series based data, Life Cycle Management (LCM) data, and monitoring data of CNFs/VNFs may be stored in relational and time-series based stores. Minio is an object storage to store very large files like CNF package, VNF package, etc. The CNFs/VNFs package usually contain helm packages, docker images and metadata. During CNF package on boarding, helm charts are stored in chartmuseum. Some applications in the first data system 110 use PV to store stateful data like CNF package, VNF package, NSSI Performance reports etc. As already explained, the first data system 110 includes applications like registry, database, kafka, application manager, NFVO, VNFM, NSSMF, NSMF and application database is configured to store application version currently being used on the set of first servers 112-A, 112-B, . . . 112-N of the first data system 110. It is noted that the set of first databases 114-A, 114-B, . . . , 114-N are shown for example purposes and the first database 114-A may be associated with the set of first servers 112-A, 112-B, . . . 112-N.

In an example, the first data system 110 is referred to as an operational site or active site which is a primary site actively managing cloud orchestration of services provided by the first data system 110 in a cloud-native deployment. As such, the second data system 130 is a secondary site which is a geo-redundant cloud server in a different cloud e.g., public or private cloud which may be used to recover and restore infrastructure and operations when at least one first server of the set of first servers 112-A, 112-B, . . . 112-N in the operational site fails or becomes unavailable. In an embodiment, the second data system 130 comprises at least one second server. In this example representation (shown in FIG. 1A), the at least one second server is represented as a set of second servers 132-A, 132-B, . . . 132-N in FIG. 1A. It is noted that the set of second servers 132-A, 132-B, . . . 132-N are shown for example purposes and the disclosure may be practiced with one second server. However, a number of first servers in the first data system 110 and a number of second servers in the second data system need to be the same. Further, it is noted that embodiments of the present disclosure are hereinafter explained with reference to the set of second servers 132-A, 132-B, . . . 132-N which are interchangeably referred to as the at least one second server throughout the disclosure.

These set of second servers 132-A, 132-B, . . . 132-N have the same or similar functionality as the set of first servers 112-A, 112-B, . . . 112-N. For example, each second server of the set of second servers 132-A, 132-B, . . . 132-N is capable of performing a function of a network function/element of corresponding first server of the set of first servers 112-A, 112-B, . . . 112-N. In an embodiment, the first set of servers (112-A, 112-B, . . . , 112-N) and the second set of servers (132-A, 132-B, . . . , 132-N) comprise: a plurality of cloud native stateless services and a plurality of cloud native stateful services. For example, if first server 112-A performs functions of the EMS, then the second server 132-A of the second data system 130 is also capable of performing the functions of the EMS. In an embodiment, the second data system 130 includes a set of second databases 134-A, 134-B, . . . 134-N hosted on the set of second servers 132-A, 132-B, . . . 132-N. These set of second databases 134-A, 134-B, . . . 134-N correspond to the first set of databases 114-A, 114-B, . . . , 114N. In other words, the second set of databases 134-A, 134-B, . . . 134-N are configured to store the stateful data stored in the set of first databases 114-A, 114-B, . . . , 114N. For example, the second database 134-A is configured to synchronize and store the stateful data as stored in the first database 114-A. It is noted that the first data system 110 is referred to as the operational site for example purposes and the second data system 130 may also assume the role as the operational site to actively manage orchestration of cloud services when one or more servers of the set of first servers 112-A, 112-B, . . . 112-N of the first data system 110 fail as will be explained in greater detail below.

The first data system 110 and the second data system 130 are cloud orchestrators which include a set of distributed cloud native micro services, which can be stateful or stateless. It is noted that the cloud native microservices may be implemented as distributed servers e.g., the set of first servers 112-A, 112-B, . . . 112-N and the set of second servers 132-A, 132-B, 132-N on public/private cloud. In other words, the first data system 110 and the second data system 130 are geo-redundant sites. In an embodiment, the stateful data from the first data system 110 needs to be synchronized with the second data system 130. More specifically, the stateful data from the set of first databases 114-A, 114-B, . . . , 114N need to be stored in corresponding second database of the set of second databases 134-A, 134-B, . . . , 134N to ensure consistency of the stateful data across the geo-redundant sites e.g., the first data system 110 and the second data system 130, to ensure disaster recovery.

The term 'disaster recovery' as used herein may refer, for example, to a set of policies, tools, and processes used to recover or continue operations of critical Information Technology (IT) infrastructure, software, and systems after a natural or human-made disaster. Some examples of the disaster include, but not limited to, earthquakes, floods, tornados, hurricanes, wildfires, pandemics, epidemics, cyber-attacks (e.g., malware, DDoS, ransomware attacks), human-caused threats such as, terrorist, biochemical attacks, technological hazards (e.g., power outages, pipeline explosions, transportation accidents, etc.), machine or hardware failure. In general, if the first data system 110 supporting services of an organization fails, then the second data system 130 initiates providing services to the organization till the first data system 110 is recovered or restored.

In an embodiment, a set of first managers 116-A, 116-B, . . . , 116-N are associated with the set of first servers 112-A, 112-B, . . . 112-N. The set of first managers 116-A, 116-B, . . . , 116-N may include controllers (e.g., including various control and/or processing circuitry) which manage coordinating and synchronizing the stateful data between the operational site and disaster recovery site to maintain consistent data between geographical separated cloud orchestrators (e.g., the first data system 110 and the second data system 130). For example, first manager 116-A manages synchronization of the stateful data between the first server 112-A of the first data system 110 and the second server 132-A of the second data system 130. Similarly, in an embodiment, a set of second managers 136-A, 136-B, . . . , 136-N are associated with the set of second servers 132-A, 132-B, . . . 132-N. The set of second managers 136-A, 136-B, . . . , 136-N may include controllers (e.g., including various control and/or processing circuitry) which manage coordinating and synchronizing the stateful data between the first data system 110 and the second data system 130. For example, the second manager 116-A manages synchronization of the stateful data between the first server 112-A of the first data system 110 and the second server 132-A of the second data system 130. It is noted that although each first manager of the set of first managers 116-A, 116-B, . . . , 116-N is depicted and described to manage operations of corresponding first server, for example, first manager 116-A manages operations of the first server 112-A, it is noted that a single manager may be configured to manage the operations/functions of the set of first servers 112-A, 112-B, . . . 112-N e.g., a first data system manager 120 to manage operations of the first data system 110 and a second data system manager 140 to manage operations of the second data system 130 which is explained in greater detail below with reference to FIG. 1B. In an embodiment, the first data system manager 120 may manage the plurality of first managers 116-A, 116-B, . . . , 116-N and the second data system manager 140 may manage the plurality of second managers 136-A, 136-B, . . . , 136-N.

During operation, the set of first managers 116-A, 116-B, . . . , 116-N of the first data system 110 and the set of second managers of the second data system 130 may manage synchronization of stateful data from the set of first databases 114-A, 114-B, . . . , 114N with the corresponding set of second databases 134-A, 134-B, . . . , 134N based on mapping information. In an example scenario, a first server 112-A implementing a container (CNF/VNF) of the set of first servers 112-A, 112-B, . . . 112-N may fail due to a disaster. However, the other first servers 112-B, . . . 112-N of the set of first servers 112-A, 112-B, . . . 112-N may be in operation.

Various embodiments of the present disclosure provide a method and set of geo-redundant operators for managing geo-redundant cloud servers. In general, the set of geo-redundant operators implement methods which facilitates disaster recovery. For example, embodiments disclose a set of first geo-redundant operators 118-A, 118-B, . . . , 118-N associated with corresponding set of first servers 112-A, 112-B, . . . 112-N and a set of second geo-redundant operators 138-A, 138-B, . . . , 138-N associated with corresponding set of second servers 132-A, 132-B, . . . 132-N for synchronizing the stateful data between the first data system 110 and the second data system 130 which are geo-redundant. In general, these geo-redundant operators (e.g., the set of first geo-redundant operators 118-A, 118-B, . . . , 118-N and the set of second geo-redundant operators 138-A, 138-B, . . . , 138-N) are geo-redundancy aware and aid in synchronizing the stateful data between the operational site and the geo-redundant site. More specifically, the geo-redundant operator synchronizes stateful data from each first database of the set of first databases 114-A, 114-B, . . . , 114N to a corresponding second database of the set of second databases 134-A, 134-B, . . . , 134N associated with the set of second servers 132-A, 132-B, . . . 132-N based on the state information, the health information and one or more synchronization parameters. An example of the first data system manager 120 to manage operations of the first data system 110 is shown and explained in greater detail below with reference to FIG. 1B.

Figure 1B:
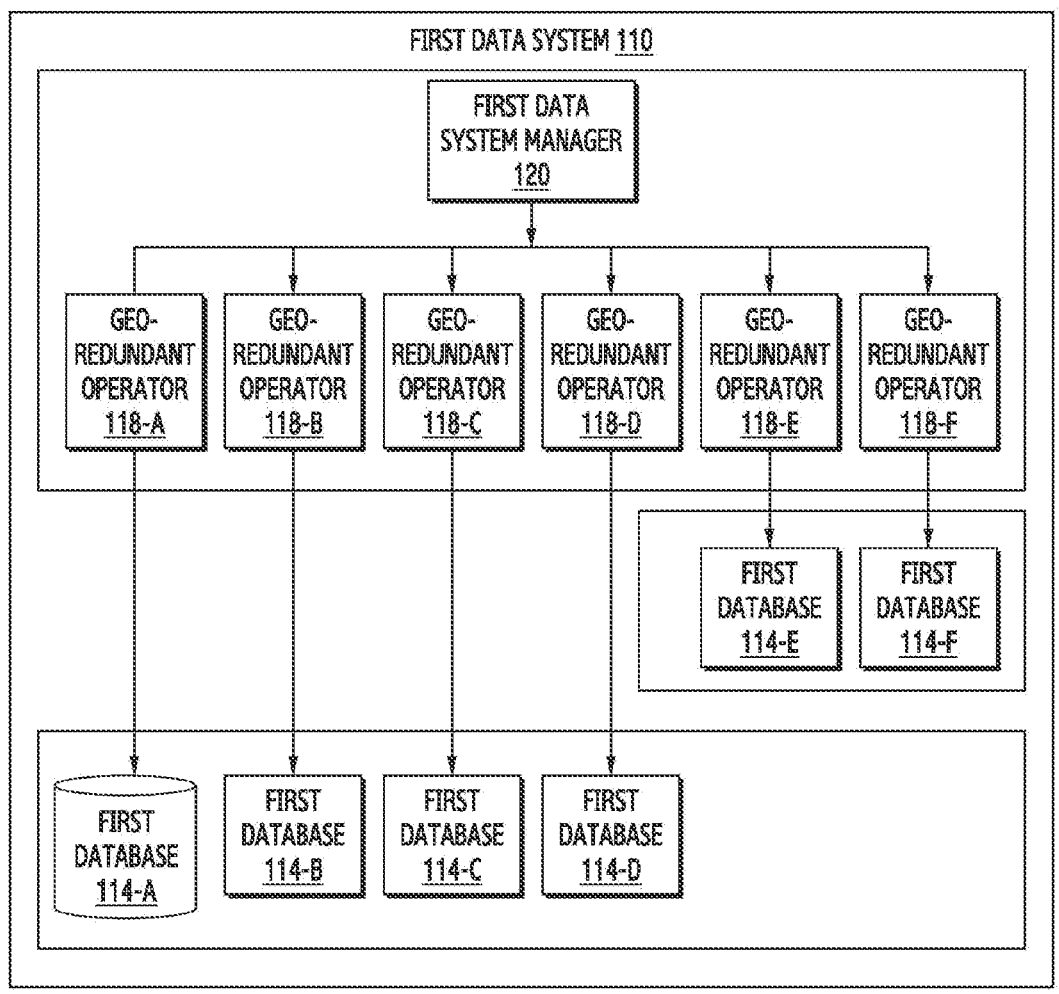
FIG. 1B is a block diagram illustrating an example geo-redundant cloud orchestrator, according to various embodiments.

FIG. 1B is a block diagram illustrating an example configuration of the first data system 110, according to various embodiments. As already explained, the first data system 110 includes the first data system manager 120 which manages operations of the first data system 110. It is noted that the first data system manager 120 may be configured to manage the set of first managers 116-A, 116-B, . . . , 116-N associated with the set of first servers 112-A, 112-B, . . . 112-N of the first data system 110. It is noted that the set of first servers 112-A, 112-B, . . . 112-N and the set of first managers 116-A, 116-B, . . . 116-N have not been shown nor described in FIG. 1B for the sake of brevity. However, it is noted that the set of first servers 112-A, 112-B, . . . 112-N are integral part of the first data system 110 and operations of the set of first managers 116-A, 116-B, . . . 116-N are explained with reference to the first data system manager 120.

In an embodiment, the first data system manager 120 is configured to: (1) exchange health information of the first data system 110 with the second data system manager 140 of the second data system 130, (2) maintain a geo-redundancy status based on the health information of the first data system 110 and/or the second data system 130, (3) provide information to the set of first geo-redundant operators 118-A, 118-B, . . . , 118-N essential for synchronization of the stateful data, and (4) provide alarm management, (5) check the status of the other first geo-redundant operators associated with the set of first servers 112-A, 112-B, . . . , 112-N, (6) maintain status and last sync-status of each first geo-redundant operators of the set of first geo-redundant operators 118-A, 118-B, . . . , 118-N.

In an embodiment, the set of first geo-redundant operators 118-A, 118-B, . . . , 118-N are applications that are responsible for synchronizing the stateful data between the set of first databases 114-A, 114-B, . . . 114-N hosted on corresponding server of the set of first servers 112-A, 112-B, . . . 112-N on the first data system 110 with the set of second databases 134-A, 134-B, . . . 134-N of the second data system 130. More specifically, each first geo-redundant operator of the set of first geo-redundant operators 118-A, 118-B, . . . , 118-N synchronizes the stateful data from corresponding first database with a corresponding second database of the second data system 130 with the help of a corresponding second geo-redundant operator. In an embodiment, a separate geo-redundant operator is created for each Platform-as-a-Service (PaaS) or microservice (herein, a first server such as the first server 112-A) of the first data system 110. In other words, each first geo-redundant operator is configured to facilitate synchronizing of a specific stateful data. In general, each microservice application on the first data system 110 has several stateful elements, such as, Registry, Database (e.g. MariaDB), Object-store (e.g. MinIO/S3), PVC and block-storage and a separate policy driven geo-redundant operators for each of them. As such, synchronizing the stateful data between the operational site and redundant site refers to synchronizing the stateful PaaS with the disaster recovery site PaaS. Some examples of the set of first geo-redundant operators 118-A, 118-B, . . . , 118-N include, but not limited to, registry operator, database operator, chartmuseum operator, minio operator, PVC operator, applications operator, and the like. It is noted that one or more first geo-redundant operators may be defined based on requirements for synchronizing each new type of stateful data.

In this example representation, the first data system manager 120 manages a geo-redundant database operator (shown and referred to interchangeably as 'first geo-redundant operator 118-A'), a geo-redundant registry operator (shown and referred to interchangeably as 'first geo-redundant operator 118-B'), a geo-redundant chartmuseum operator (shown and referred to interchangeably as 'first geo-redundant operator 118-C'), a geo-redundant minio operator (shown and referred to interchangeably as first geo-redundant operator 118-D), a geo-redundant PVC operator (shown and referred to interchangeably as 'first geo-redundant operator 118-E') and a geo-redundant application operator (shown and referred to interchangeably as 'first geo-redundant operator 118-F').

The geo-redundant database operator 118-A facilitates synchronization of stateful data such as, but not limited to, relational data, NoSQL data, time-series data, and the like stored in the first database 114-A with a corresponding second database 134-A in the second data system 130. The geo-redundant database operator 118-A is responsible for synchronizing relational/NoSQL/GraphDB/Time-series based data from the first server 112-A to the second server 132-A. The one or more synchronization parameters are defined specifically for the database operator. In an embodiment, the synchronization indicator may be configured to enable or disable the database operator (e.g., the first geo-redundant operator 118-A) on a need basis. In an embodiment, the database operator may also be synchronizing at a table level. In an embodiment, the one or more synchronization parameters also define not to synchronize certain databases or specific tables in the database. In an embodiment, a priority may be defined for synchronizing the tables in the database. For example, tables with high priority will be synchronized in real-time from the first database 114-A to the second database 134-A. In an example, the stateful data is transferred from the first database 114-A to the second database 134-A using streams and binlog mechanism. Moreover, the one or more synchronization parameters may be adapted to set time periods for synchronizing low priority schemas/databases. In an embodiment, the one or more synchronization parameters may also be configured to exclude certain type of table/columns from a database. In an embodiment, the one or more synchronization parameters provide configurations to reverse synchronize certain stateful data from the second server 132-A to the first server 112-A when coordinated by the underlying microservice in the first server 112-A of the first data system 130.

The geo-redundant registry operator 118-B facilitates synchronization of stateful registry data stored in the first database 114-B with a corresponding second database 134-B in the second data system 130. The geo-redundant registry operator 118-B is responsible for synchronizing docker images from the first server 112-B with the second server 132-B. The one or more synchronization parameters are defined specifically for the registry operator. In an embodiment, the synchronization indicator may be configured to enable or disable the registry operator (e.g., the first geo-redundant operator 118-B) on a need basis. In an example, the one or more storage types may be defined not to synchronize docker images from certain repositories. In another example, one or more storage types support not to delete docker images from the second database 134-B (e.g., DR site) immediately after deletion from the first server 112-B or the OP site. In yet another example, the one or more synchronization parameters support auto clean up of docker images based on a docker image age. In an embodiment, the synchronization time may be configured to set sync intervals between the first server 112-B and the second server 132-B. The one or more synchronization parameters also provides configurations to set ignore synchronization for certain types of images filtered based on tag/path as per application needs. In an embodiment, the one or more synchronization parameters provide configurations to reverse synchronize certain stateful data from the second server 132-B to the first server 112-B when coordinated by the underlying microservice in the first server 112-B of the first data system 110.

The geo-redundant chartmuseum operator 118-C facilitates synchronization of chartmuseum stateful data stored in the first database 114-C with a corresponding second database 134-C in the second data system 130. CNFs are usually helm charts and as such, CNF package contains helm packages, docker images and metadata. During CNF package on boarding, helm charts are stored in chartmuseum databases (e.g., first database 114-C). To support disaster recovery between cloud orchestrators (e.g., the first data system and the second data system 130), the chartmuseum operator 118-C will transfer helm charts from the first database 114-C to the second database 134-C based on events. The chartmuseum operator 118-C may be enabled/disabled on a need basis. The chartmuseum operator 118-C also supports not to delete helm charts from the second database 114-C immediately after deletion from the first database 114-C. However, the chartmuseum operator 118-C supports auto clean up based on helm chart age. If there are failures during synchronization, standard alarms will be raised by the chartmuseum operator 118-C to take suitable actions. The chartmuseum operator 118-C may be configured to exclude certain type of stateful data and reverse synchronize certain stateful data from the second database 134-C to the first database 114-C when coordinated by underlying microservice of the first server 114-C.

The geo-redundant minio operator 118-D facilitates synchronization of minio stateful data stored in the first database 114-D with a corresponding second database 134-D in the second data system 130. The minio operator 118-D is sued for synchronizing very large files like CNF package, VNF package etc. The minio operator 118-D is responsible for synchronizing minio buckets from the first server 112-D to the second server 132-D. The minio operator 118-D maybe enabled/disabled on need basis. If there are failures during synchronization, standard alarms will be raised by the minio operator 118-D to take suitable actions. To support disaster recovery, the minio operator 118-D transfers CNF/VNF packages from the first server 112-D to the second server 132-D based on events. The minio operator 118-D may be configured to exclude certain type of stateful data and reverse synchronize certain stateful data from the second database 134-D to the first database 114-D when coordinated by underlying microservice of the first server 114-D.

The geo-redundant PVC operator 118-E facilitates synchronization of PV stateful data stored in the first database 114-E with a corresponding second database 134-E in the second data system 130. Some applications in CO use PV to store stateful data like CNF package, VNF package, NSSI Performance reports etc. To support disaster recovery PV is copied from the first database 114-E to the second database 134-E on event basis. The PVC operator 118-E may be enabled or disabled on need basis. Moreover, the one or more synchronization parameters are defined to exclude synchronization of PVCs from certain stateful applications. If there are failures during synchronization, standard alarms will be raised by the PVC operator 118-E to take suitable actions. The PVC operator 118-E may be configured to exclude certain type of stateful data and reverse synchronize certain stateful data from the second database 134-E to the first database 114-E when coordinated by underlying microservice of the first server 114-E.

The geo-redundant application operator 118-F facilitates synchronization of application related stateful data (e.g., different versions, updates, etc.) stored in the first database 114-F with a corresponding second database 134-F in the second data system 130. The application operator 118-F is configured to raise suitable alarms if there is mismatch in application version between the first server 112-F and the second server 132-F. The application operator 118-F may be enabled or disabled on need basis. The application operator 118-F supports workflows to install or delete one or more applications in the second server 132-F based on the first server 112-F. If there are failures during synchronization, standard alarms will be raised by the geo-redundant application operator 118-F to take suitable actions. The one or more synchronization parameters may be configured such that the geo-redundant application operator 118-F provides configurations to set synchronization intervals between the first server 112-F and the second server 132-F, exclude certain type of data and reverse synchronize certain stateful data from the second database 134-F to the first database 114-F when coordinated by underlying microservice of the first server 114-F. The applications in both the first server 112-F and the second server 132-F are usually mirror of each other. If for some reason, the first server 112-F and the second server 132-F have some mismatch, for example, application installed in the second server 132-F is lower version compared to the application running in the first server 112-F, or some applications are missing in the second server 132-F, then geo-redundant application operator 118-F triggers workflows to ensure updating of the application in the second server 132-F to synchronize with the application on the first server 112-F.

The first databases 114-A to 114-D synchronize stateful data from PaaS (e.g., first servers 112-A, 112-B, 112-C, 112-D executing different PaaS application) and the first databases 114-E, 114-F synchronize stateful data from the cloud orchestrator applications (e.g., first servers 112-E, 112-F).

In an embodiment, each of these geo-redundant operators may be customized to synchronize data based on one or more synchronization parameters. In an embodiment, the one or more synchronization parameters comprises: a synchronization time, one or more data types, a synchronization priority and a synchronization indicator. In an example, synchronization may be enabled/disabled based on storage type. For example, the geo-redundant minio operator may be configured to transfer minio stateful data from the first data system 110 to the second data system 130. In another example, if stateful data of AWS is to be synchronized, we can introduce a geo-redundant S3 operator instead of the geo-redundant minio operator. In such cases, default geo-redundant operators may be disabled and new operators may be added. In an example, synchronization time between the first data system 110 and the second data system 130 is configurable and can vary based on storage type, application specific type, and any other context as may be defined. Moreover, the geo-redundant operators facilitate addition of custom configurations so that certain type of data can be excluded during synchronization of the stateful data between the first data system 110 and the second data system 130. In an embodiment, the geo-redundant operators also provide addition of custom configurations so that certain type of data is synced from the first data system 110 to the second data system 130 and vice versa. It is noted that the second data system manager 140 performs operations similar to the first data system manager 120 and is not explained herein for the sake if brevity. The geo-redundant operators are geo-redundancy aware and facilitate synchronizing the stateful data between the first data system 110 and the geo-redundant second data system 130 in the wireless communication system 100 is explained in greater detail below with reference to FIG. 2.

Figure 2:
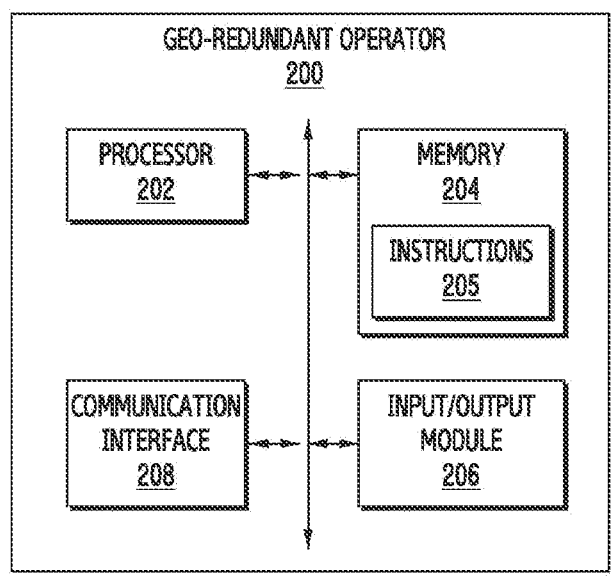
FIG. 2 is a block diagram illustrating an example configuration of a geo-redundant operator for managing geo-redundant cloud servers, according to various embodiments.

FIG. 2 is a block diagram illustrating an example configuration of a geo-redundant operator 200 for managing geo-redundant cloud servers, according to various embodiments. The term 'geo-redundant operator' as used herein may refer, for example, to any server/system that facilitates in synchronizing of stateful data from each first database in the first data system 110 with corresponding second database in the second data system 130. For example, these geo-redundant operators are geo-redundancy aware and aid in synchronizing the stateful data between the operational site and the geo-redundant site. In an embodiment, the geo-redundant operator 200 is the first geo-redundant operator 118-A of the first data system 110. In an embodiment, at least one first geo-redundant operator of the set of first geo-redundant operators 118-A, 118-B, . . . , 118-N is associated with at least one first database hosted on a first server of the set of first servers 112-A, 112-B, . . . , 112-N. In one example, the first geo-redundant operator 118-A is associated with the first database 114-A hosted on the first server 112-A of the first data system 110. In another example, the geo-redundant operator 118-A may be associated with databases 114-A and 114-B hosted on the first servers 112-A, 112-B, respectively, for facilitating synchronization of the stateful data between the first server 112-A, 112-B and the second server 132-A, 132-B.

It is noted that embodiments of the present disclosure are hereinafter described with reference to the first geo-redundant operator 118-A. However, it is noted that various embodiments described herein may be practiced with other geo-redundant operators (e.g., geo-redundant operators 118-B, . . . , 118N) of the first data system 110. Moreover, each of the set of second geo-redundant operators may also be configured to perform one or more operations herein when a corresponding server of the set of second servers 132-A, 132-B, . . . , 132-N perform roles of corresponding first server due to disaster/failure.

The geo-redundant operator 118-A may include a processor (e.g., including processing circuitry) 202, a memory 204, an input/output module (e.g., including input/output circuitry) 206, and a communication interface (e.g., including communication circuitry) 208. It is noted that, in various embodiments, the geo-redundant operator 118-A may include more or fewer components than those depicted herein. The various components of the geo-redundant operator 118-A may be implemented using hardware, software, firmware or any combinations thereof. further, the various components of the geo-redundant operator 118-A may be operably coupled with each other. More specifically, various components of the geo-redundant operator 118-A may be capable of communicating with each other using communication channel media (such as buses, interconnects, etc.).

In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like. The processor 202 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the memory 204 is capable of storing machine executable instructions, referred to herein as instructions 205. In an embodiment, the processor 202 is embodied as an executor of software instructions. As such, the processor 202 is capable of executing the instructions 205 stored in the memory 204 to perform one or more operations described herein. Further, the memory 204 is capable of storing a state information of corresponding first server 112-A, a health information of corresponding second server 132-A and one or more synchronization parameters.

In an embodiment, the state information of the first server 112-A represents one of: an operational server, and a redundant server. For example, if the first server 112-A is active and configured to be the operational server, then the state information of the first server 112-A is the operational server. If the first server 112-A is redundant server and is used to backup stateful data such that the first server 112-A may be used in cases of failure of corresponding server which is active/operational, then the state information of the first server is set to redundant server. In some example scenarios, the first server 112-A may be the operational server and may fail (e.g., hardware failure or any kind of natural disaster), then the first server 112-A is taken down completely for maintenance. The state information of such servers would not be available for the other geo-redundant servers in operational/geo-redundant site. In an embodiment, the health information of corresponding second server 132-A includes a heartbeat information from the second server 132-A. In an embodiment, the one or more synchronization parameters include, but not limited to, a synchronization time, one or more data types, a synchronization priority and a synchronization indicator. The synchronization time defines the synchronization interval, for example, synchronization between the first database 114-A and the second database 134-A every 1 second. The one or more synchronization datatypes define the data types that may be synchronized between the first database 114-A and the second database 134-A, for example, synchronize only relational data. The synchronization priority defines the priority for synchronizing specific data types. For example, relational data may be prioritized over time-series based data for synchronization between the first database 114-A and the second database. The synchronization indicator may indicate enabling or disabling of synchronization based on storage type. As such, the one or more synchronization parameters for the geo-redundant operator 118-A may be customized based on requirements of an organization.

The memory 204 can be any type of storage accessible to the processor 202 to perform respective functionalities, as will be explained in detail with reference to FIGS. 2 to 6. For example, the memory 204 may include one or more volatile or non-volatile memories, or a combination thereof. For example, the memory 204 may be embodied as semiconductor memories, such as flash memory, mask ROM, PROM (programmable ROM), EPROM (erasable PROM), RAM (random access memory), etc. and the like.

In an embodiment, the processor 202 may be configured to execute the instructions 205 for: (1) retrieving the stateful data from the corresponding first database 114-A, (2) transferring the stateful data to corresponding second geo-redundant operator 138-A, (3) sending a data request to a corresponding second geo-redundant operator 138-A for the stateful data stored in the corresponding second database 134-A, (4) receiving the stateful data from the corresponding second geo-redundant operator 138-A, (5) comparing the stateful data stored in the first database 114-A with a corresponding stateful data received from the second database 134-A to determine difference data, (5) transferring the difference data to the corresponding second geo-redundant operator 138-A for storing in the corresponding second database 134-A on determining unavailability of the difference data in the corresponding second database 134-A, (6) deleting the difference data from the second database 134-A when the difference data is unavailable with the corresponding first database 114-A, (7) monitor a geo-redundancy status associated with the first server 112-A from the first manager 116-A, (8) stop the synchronizing of the stateful data when the geo-redundancy status is disabled. The first geo-redundant operator 118-A is configured to send a notification to the corresponding first manager 116-A based on the synchronizing of the stateful data.

In an embodiment, the I/O module 206 may include various circuitry configured to receive inputs from and provide outputs to an operator managing of the geo-redundant operator 118-A. The term 'operator' as used herein may refer to one or more individuals, whether directly or indirectly, associated with managing operations of the operations of the geo-redundant servers (e.g., first and second data system 110, 130). In an embodiment, the one or more synchronization parameters may be provided by the operator who may also periodically update the synchronization parameters based on organization requirements.

To enable reception of inputs and provide outputs to the geo-redundant operator 118-A, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like. It is noted that some network nodes in the wireless communication system 100 may not include all the components listed above in the input interface/output interface and hence it should be apparent to a person skilled in the art that embodiments of the present disclosure may be practiced without the input interface/output interface.

The communication interface 208 may include various communication circuitry configured to communicate with other entities in the first server 112-A of the first data system 110 such as, the first manager 116-A associated with the first server 112-A and the first database 114-A hosted on the first server 112-A of the set of first servers 112-A, 112-B, . . . , 112-N in a first data system 110. In an embodiment, the communication interface 208 is configured to receive: (1) state information of corresponding first server 112-A, and (2) health information of the second server 132-A of the second data system 130, from the first manager 116-A managers associated with the first server 112-A. The state information of the corresponding first server 112-A represents one of: an operational server, and a redundant server. In other words, the state information indicates if the first server 112-A is a main server or a redundant server. The health information of the second server 132-A includes a heartbeat information from the second server 132-A. The one or more synchronization parameters comprises: a synchronization time, one or more data types, a synchronization priority, and a synchronization indicator. The geo-redundant operator 118-A also receives a geo-redundancy status associated with a corresponding first server 112-A from the first manager 116-A. The geo-redundancy status indicates if there are geo-redundant servers such as, the second server 132-A available for synchronization of the stateful data from the first server 112-A of the first data system 110. As such, in an embodiment, the communication interface 208 is configured to monitor the geo-redundancy status of the first server 112-A from the first manager 116-A every defined time interval, for example, every 10 seconds. The communication interface 208 also communicates with other entities such as, the second geo-redundant operator 138-A corresponding to the first geo-redundant operator 118-A for transferring the stateful data to be stored in the second database 134-A as will be explained in detail hereinafter.

In an embodiment, the communication interface 208 is configured to forward the state information of corresponding first server 112-A, health information of the second server 132-A of the second data system 130, and geo-redundancy status of the first server 112-A to the processor 202. The processor is configured to process such information (e.g., state information, health information and geo-redundancy status to synchronize the stateful data between the first server 112-A of the first data system 110 and the second server 132-A of the second data system 130. An example method of synchronizing the stateful data in the first database 114-A between the first server 112-A and the second server 132-A is explained in greater detail below with reference to FIG. 3.

Figure 3:
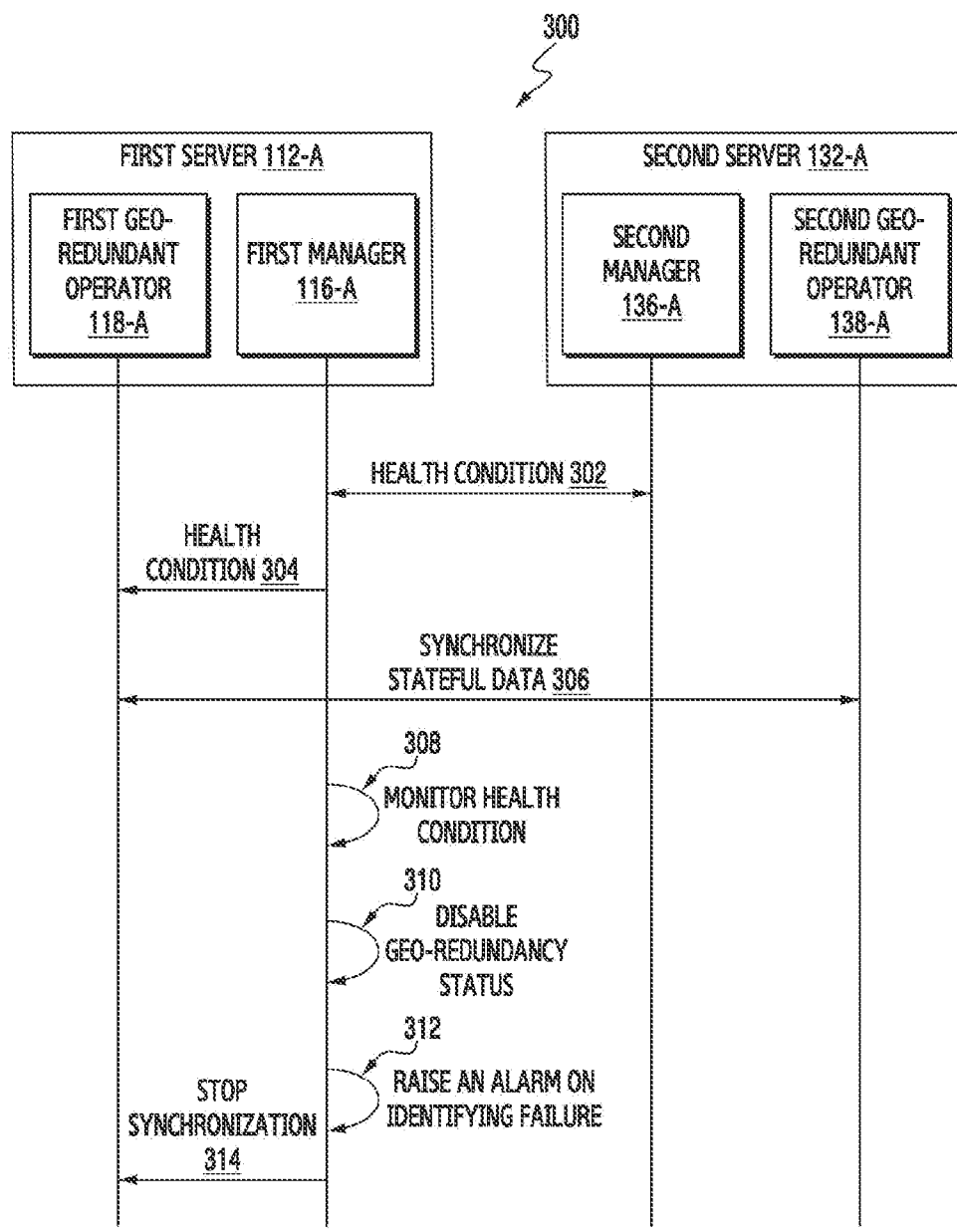
FIG. 3 is a signal flow diagram illustrating example operations for managing geo-redundant cloud servers, according to various embodiments.

FIG. 3 is a signal flow diagram 300 illustrating example operations of the first geo-redundant operator 200 managing geo-redundant cloud servers, according to various embodiments. It is noted that the first geo-redundant operator 200 may also synchronize stateful data between the at least one first server and the at least one second server, such as, between the first databases 114-A, 114-B, . . . , 114-N and the second databases 134-A, 134-B, . . . , 134-N.

At 302, health condition is exchanged between the first manager 116-A associated with the first server 112-A and the corresponding second manager 136-A of the second server 132-A. The health information of the second server 132-A may include, for example, a heartbeat information from the second server 132-A. For example, once the geo-redundancy status is enabled for the first server 112-A and the second server 132-A, the heartbeat information is exchanged between the first server 112-A and the corresponding second server 132-A. The first manager 116-A sets a geo-redundancy status to enabled and it is noted that the first geo-redundant operator 118-A synchronizes the stateful data stored in the first database 114-A of the first server 112-A with the second database 134-A hosted on the second server 132-A with the help of the second geo-redundant operator 138-A when the health condition of the first server 112-A and the second server 132-A are good.

At 304, the first geo-redundant operator 118-A receives health condition of the second server 132-A from the first manager 116-A.

At 306, the first geo-redundant operator 118-A and the second geo-redundant operator 138-A synchronize the stateful data. For example, the stateful data from the first database 114-A is synchronized with a corresponding second database 134-A. The synchronization between the first database 114-A and the second database 134-A are performed based on the state information, the health information and one or more synchronization parameters. It is noted that the first database 114-A and the second database 134-A continue to synchronize based on the health condition of the second server 132-A and the geo-redundancy status.

At 308, the first manager 116-A monitors health condition of the second server 132-A continuously. If the first manager 116-A fails to receive heartbeat from the second server 132-A for more than a predefined time period, then the second server 132-A has some failure.

At 310, the first manager 116-A disables the geo-redundancy status.

At 312, the first manager 116-A raises an alarm indicating the health condition of the second server 132-A. In an example, the alarm is sent to the first manager 116-A using message queues such as Kafka.

At 314, the first manager 116-A instructs the first geo-redundant operator 118-A to stop synchronizing the stateful data with the second database 134-A of the second data system 130.

In an embodiment, if the heartbeat information is not received by the second manager 136-A of the second server 132-A for the predefined time duration from the first manager 116-A of the first server 112-A, then the health condition of the first server 112-A is bad. In such a case, the second server 132-A assumes role of the operational server. More specifically, the state information of the second server 132-A is set to operational server. Further, the second manager 136-A disables the geo-redundancy status and instructs the second geo-redundant operator 138-A to stop synchronizing the stateful data with the first database 114-A of the first server 112-A. A method for dynamically synchronizing stateful data between the first database 114-A and the second database 134-A in geo-redundant cloud servers is explained in greater detail below with reference to FIGS. 4A and 4B.

Figure 4A:
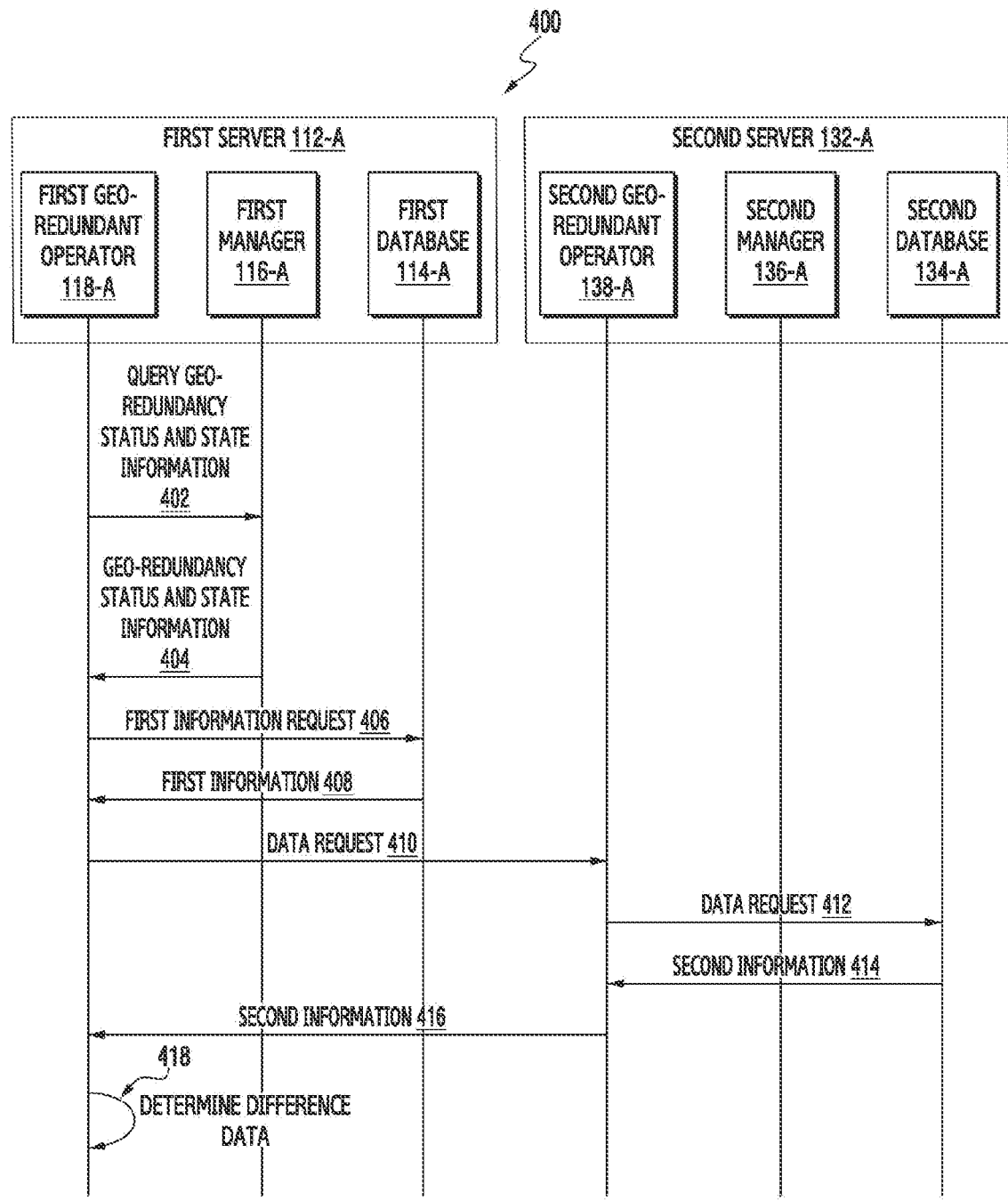
FIGS. 4A and 4B are signal flow diagrams illustrating an example method for synchronizing stateful data from the first database in geo-redundant cloud servers, according to various embodiments.
Figure 4B:
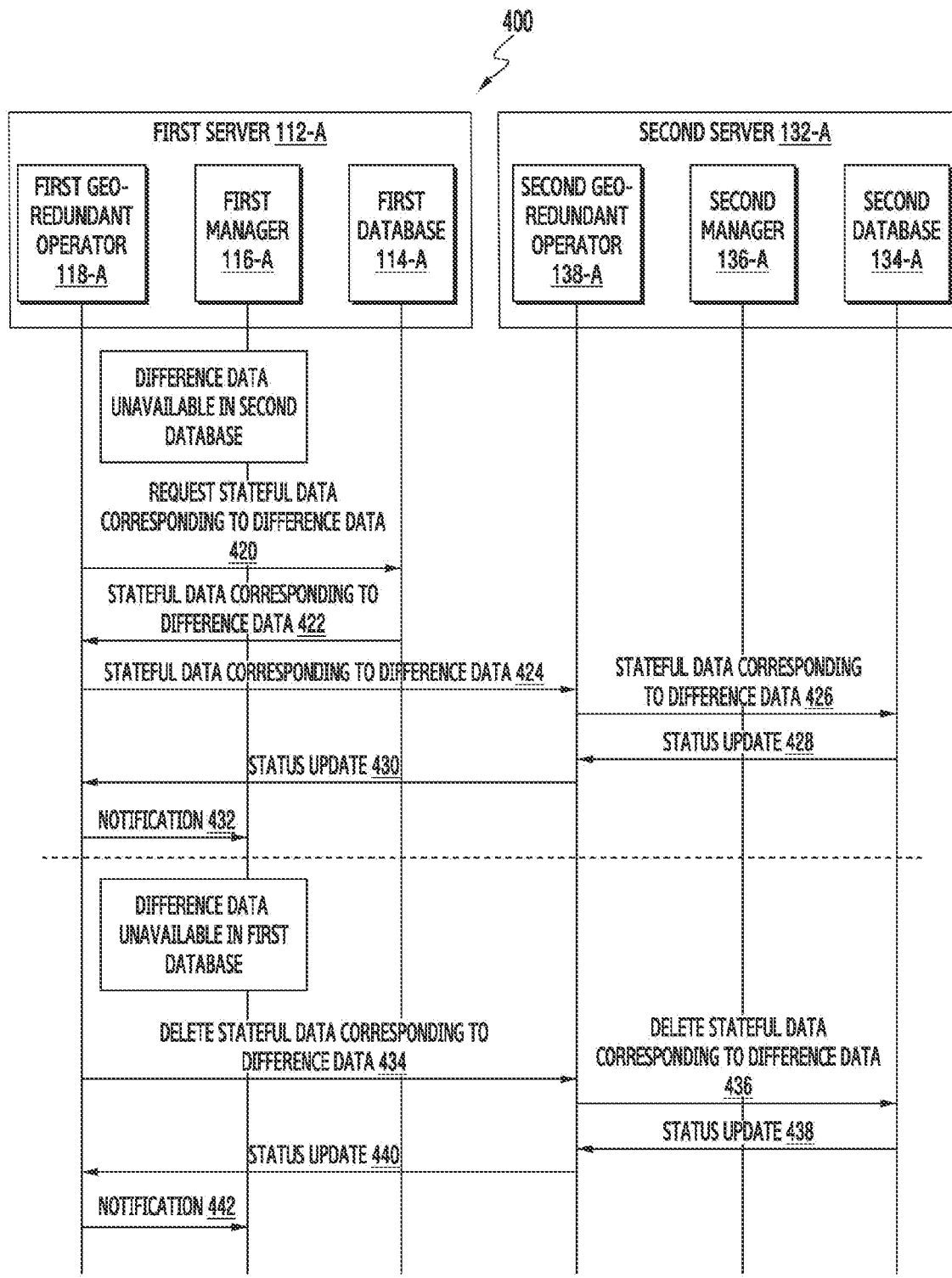

FIGS. 4A-4B are signal flow diagrams 400 collectively, illustrating an example method for synchronizing stateful data from the first database 114-A in geo-redundant cloud servers, according to various embodiments. In this example, the stateful data is synchronized between the first database 114-A hosted on the first server 112-A and the second database 134-A hosted on the second server 132-A. It is noted that any other geo-redundant operator, for example, the geo-redundant operators 118-B, 118-C, . . . , 118-N may also perform the functions performed herein for synchronizing the stateful data from the corresponding first database 114-B, 114-C, . . . 114-N of the set of first servers 112-B, 112-C, . . . , 112-N with the corresponding second database 134-B, 134-C, . . . 134-N of the set of second servers 132-B, 132-C, . . . , 132-N, respectively, with the help of respective second geo-redundant operators 138-B, 138-C, . . . , 138-N. It shall also be noted that the first geo-redundant operator 132-A may also be configured to synchronize the stateful data from each first database 114-B, 114-C, . . . 114-N associated with the first servers 112-B, 112-C, . . . , 112-N with the corresponding second database 134-B, 134-C, . . . 134-N associated with the second servers 132-B, 132-C, . . . , 132-N, respectively, In this example representation, the first geo-redundancy operator 118-A is a registry operator.

At 402, the first geo-redundancy operator 118-A is configured to query the first manager 116-A for the state information and the geo-redundancy status of the first server 112-A.

At 404, the first manager 116-A sends the state information and the geo-redundancy status of the first server 112-A. This makes the first geo-redundant operator 118-A geo-redundancy aware and ensures utilization of different operators to synchronize various types of stateful data individually. In an embodiment, if the state information indicates the first server 112-A to be an operational server, then the geo-redundancy status of the first server 112-A is checked. If the state information of first server 112-A from the first manager 116-A indicates the first server 112-A to be a redundant server, then the geo-redundancy status is not checked as synchronization may not be necessary from the redundant server (e.g., the first server 112-A) to corresponding operational server (e.g., second server 132-A). If the geo-redundancy status is disabled, then the geo-redundancy operator 118-A does not perform synchronization between the first database 114-A and the second database 134-A. In other words, if the geo-redundancy status is disabled, then this indicates to the geo-redundancy operator 118-A that there are no redundant servers for synchronizing the stateful data from the first database 114-A. If the geo-redundancy status is enabled, then the geo-redundancy operator 118-A synchronizes the stateful data between the first database 114-A and the second database 134-A as will explained in greater detail below with reference to operations 406-442.

At 406, the first geo-redundant operator 118-A sends first information request to the first database 114-A. Some examples of the first information request based on the storage type and the geo-redundant operators defined herein correspond to one of: a request for list of docker images, a request for database dump, a request for list of applications, a request for performance reports in the first database 114-A, and the like. It is noted that the first information described herein is for example purposes and the first information may be different from the ones described herein to include other first information based on the type of database or the type of stateful data that is being synchronized between the first database 114-A and the second database 134-A.

At 408, the first geo-redundant operator 118-A receives first information related to the stateful data from the corresponding first database 114-A. As such, the first information may be one of a list of docker images, a database dump based on the schema type, a list of applications, performance reports, and the like stored in the first database 114-A. In an example, a list of applications App_list$_1$ stored in the first database is received by the first geo-redundant operator 118-A. In another example, the list of docker images stored in the first database 114-A may be received by the first geo-redundant operator 118-A from the first database 114-A. It is noted that the first information will depend on the type of stateful data being synchronized between the first database 114-A and the second database 134-A.

At 410, the first geo-redundant operator 118-A sends a data request to the second geo-redundant operator 138-A for second information related to the stateful data stored in the corresponding second database 134-A. In other words, the first geo-redundant operator 118-A requests the second information related to the stateful stored in the second database 134-A for comparing with the first information. As such, some examples of the data request for the second information based on the storage type and the geo-redundant operators defined herein correspond to one of: a request for list of docker images, a request for database dump, a request for list of applications, a request for performance reports in the second database 134-A, and the like.

At 412 and 414, the second geo-redundant operator 138-A retrieves the second information related to the stateful data stored in the second database 134-A. For example, the second geo-redundant operator 138-A forwards the data request for the second information to the second database 134-A at 412 and the second database 134-A sends the second information related to the stateful data to the second geo-redundant operator 138-A. For example, a list of applications App_list$_2$ stored in the second database 134-A may be retrieved by the second geo-redundant operator 138-A. In an example, the list of applications may include, but not limited to, application name, application type, application status, application version.

At 416, the second geo-redundant operator 138-A sends the second information to the first geo-redundant operator 118-A. In an example, the second geo-redundant operator 118-A sends the list of applications App_list$_2$ in the second database 134-A to the first geo-redundant operator 118-A.

At 418, the first geo-redundant operator 118-A is configured to compare the first information and the second information to determine a difference data. In general, the difference data identifies mismatch in the stateful data stored in the first database 114-A and the second database 134-A. This ensures in identifying any difference data that must be synchronized between the first database 114-A and the second database 134-A. In an example, the first geo-redundant operator 118-A is configured to compare the list of applications App_list$_1$ retrieved from the first database 114-A with the list of applications App_list$_2$ retrieved from the second database 134-A to identify the difference data. In general, any mismatch between each of the applications in the first server 112-A and the corresponding applications running on the second server 132-A may be identified based on this comparison. In one example, there may be a version mismatch between one or more applications running on the first server 112-A and corresponding one or more applications running on the second server 132-A. Such mismatch between the stateful data in the first database 114-A and the second database 134-A is identified for synchronization.

If there is no difference data, then it indicates that the first database 114-A and the second database 134-A are synchronized. If there is a difference data, the first geo-redundant operator 118-A determines if the difference is unavailable in the first database 114-A or the second database 134-A based on the comparing of the first information and the second information. In another example, an application in the first database 114-A may not be available in the second database 134-A. In yet another example, an application in the second database 134-A may not be available in the first database 114-A.

At 420, if it is determined that the difference data is unavailable in the second database 134-A, then the first geo-redundant operator 118-A requests for the stateful data corresponding to the difference data from the first database 114-A. In an example, a version mismatch identified between an application of the first server 112-A and an application of the second server 132-A may indicate in the difference data that the second database 134-A has an older version of the application. Then the first geo-redundant operator 118-A sends a request for the stateful data e.g., newer version of the application in the first database 114-A.

At 422, the first geo-redundant operator 118-A receives the stateful data corresponding to the difference data from the first database 114-A. In an example, the first geo-redundant operator 118-A receives the newer version of the application from the first database 114-A.

At 424, the first geo-redundant operator 118-A is configured to transfer the stateful data corresponding to the difference data to the corresponding second geo-redundant operator 138-A. In an example, the newer version of the application is transferred from the first geo-redundant operator 118-A to the second geo-redundant operator 138-A. In some example embodiments, the first geo-redundant operator 118-A is configured to raise an alarm for the first manager 116-A on identifying such difference data.

At 426, the second geo-redundant operator 138-A is configured to store the stateful data corresponding to the difference data to the second database 134-A. In an example, if the difference data corresponds to docker images which were not synchronized with the second database 134-A, then the docker images are synchronized with the second database 134-A. For example, stateful data corresponding to the docker images are retrieved from the first database 114-A for storing in the second database 134-A. In another example, if a database dump of the first database 114-A has not synchronized with the second database 134-A, then the database dump is uploaded to the second geo-redundant operator 138-A by the first geo-redundant operator 118-A for storing the database dump.

At 428, a status update of the synchronization is sent from the second database 134-A to the second geo-redundant operator 138-A. The status update of the synchronization is one of: a successful synchronization, and a failed synchronization.

At 430, the status update is forwarded to the first geo-redundant operator 118-A from the second geo-redundant operator 138-A.

At 432, the first geo-redundant operator 118-A sends a notification to the corresponding first manager 116-A based on the synchronizing of the stateful data. In an embodiment, the notification is one of: a successful synchronization, and a failed synchronization and is based on the status update.

It is noted that the first geo-redundant operator 118-A is configured to continuously monitor the geo-redundancy status associated with the first server 112-A as explained with reference to FIG. 3. As already explained, the first manager 116-A maintains the geo-redundancy status of the first server 112-A and as such, the geo-redundant operator 118-A queries the first manager 116-A for the geo-redundancy status. In an embodiment, the synchronizing of the stateful data between the first database 114-A and the second database 134-A is stopped when the geo-redundancy status associated with the corresponding first sever 112-A is disabled. These operations described above have not been explained herein for the sake of brevity however, it is noted that the first geo-redundant operator 118-A continuously monitors the geo-redundancy status as indicated by the first manager 116-A and performs synchronizing of the stateful data between the first server 112-A and the second server 132-A.

The operations 434-442 are performed when the difference data is unavailable with the first database 114-A.

At 434, the first geo-redundant operator 118-A is configured to instruct the second geo-redundant operator 138-A to delete the difference data from the second database 134-A as the difference data is unavailable with the first database 114-A.

At 436, the second geo-redundant operator 138-A is configured to delete the difference data from the second database 134-A.

At 438, a status update is provided by the second database 134-A to the second geo-redundant operator 138-A. The status update indicates one of a successful synchronization, and a failed synchronization.

At 440, the second geo-redundant operator 138-A is configured to send the status update to the first geo-redundant operator 118-A and the first geo-redundant operator 118-A is configured to share a notification including the status update of the synchronization between the first database 114-A and the second database 134-A with the first manager 116-A. In various embodiments, if the synchronization fails, the first manager 116-A may raise an alarm.

It is noted that embodiments of the present disclosure have been explained with reference to the first geo-redundant operator 118-A. However, embodiments of the present disclosure may be practiced with other geo-redundant operators 118-B, 118-C, . . . , 118-N in the first data system 110 or each of the set of second geo-redundant operators 138-A, 138-B, . . . 138-N of the second data system 130. Accordingly, if the synchronization operations are to be performed by the first geo-redundant operator 118-B, . . . , 118-N, for example, ge0-redundant database operator, geo-redundant application operator, or the PVC operator, the first geo-redundant operator also performs additional operations or slightly modified operations which will be explained in greater detail below with reference to FIGS. 4B and 5.

The sequence of operations of the methods 400 need not be necessarily executed in the same order as they are presented. Further, one or more operations may be grouped together and performed in form of a single step, or one operation may have several sub-steps that may be performed in parallel or in sequential manner. An example of a method for managing geo-redundant cloud servers is explained in greater detail below with reference to FIG. 5.

Figure 5:
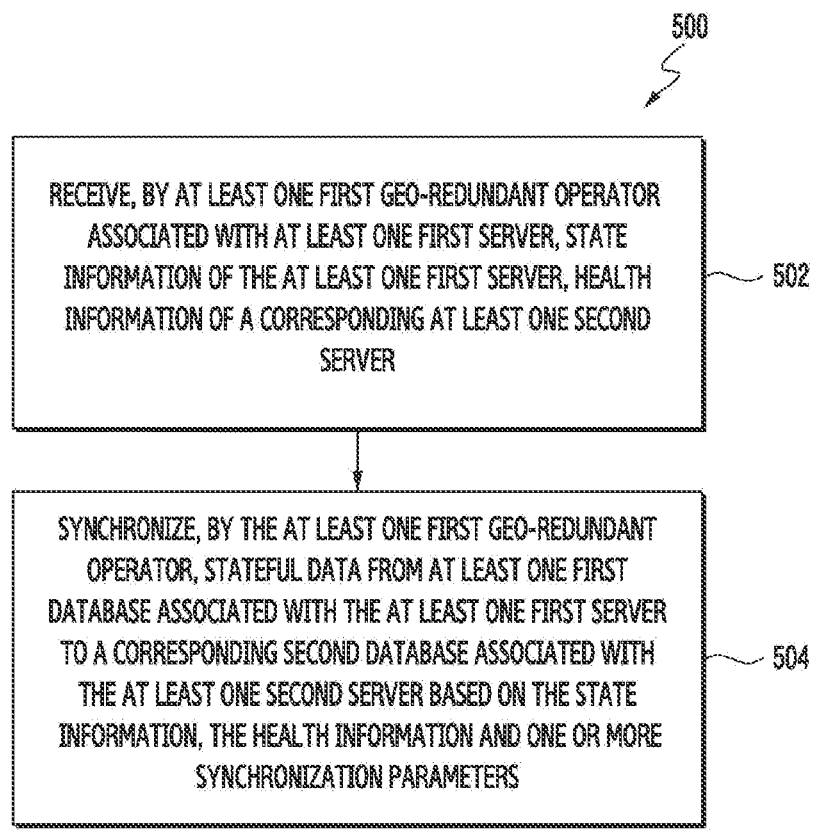
FIG. 5 is a flowchart illustrating an example method for managing geo-redundant cloud servers, according to various embodiments.

FIG. 5 is a flowchart illustrating an example method 500 for managing geo-redundant cloud servers, according to various embodiments. The method 500 illustrated in the flow diagram may be executed by, for example, the geo-redundant operator 200 shown and explained with reference to FIGS. 2 to 4A-4B. Examples of the first geo-redundant operators include, but not limited to, a registry operator, a database operator, an application operator, a minio operator, a chartmuseum operator, or any other geo-redundant operator configured to synchronize stateful data between the operational site and disaster recovery site e.g., the at least one first server and the at least one second server in the geo-redundant cloud servers of the wireless communication system 100. Operations of the flow diagram, and combinations of operation in the flow diagram, may be implemented by, for example, hardware, firmware, a processor, circuitry and/or a different device associated with the execution of software that includes one or more computer program instructions. The operations of the method 500 are described herein with help of the processor 202 embodied within the geo-redundant operator 200 of the first data system 110. It is noted that the operations of the method 500 can be described and/or practiced using one or more processors of a system/device other than the geo-redundant operator 200, for example, a manager of an associated first server in the first data system 110 or by the second geo-redundant operators 138-A, 138-B, . . . , 138-N of the second data system 130. The method 500 starts at operation 502.

At operation 502 of the method 500, state information of at least one first server 112-A, 112-B, . . . , 112-N, health information of a corresponding second server 132-A, 132-B, . . . , 132-N is received from the first manager (e.g., first manager 116-A) associated with the at least one first server 112-A, 112-B, . . . , 112-N which hosts at least one first database 114-A, 114-B, . . . , 114-N of the first data system 110. The state information of the at least one first server represents one of: an operational server, and a redundant server. The health information of the corresponding second server 132-A, 132B, . . . , 132-N comprises: a heartbeat information from each second server of the set of second servers 132-A, 132B, . . . , 132-N. In an embodiment, the at least one first geo-redundant operator 118-A, 118-B, . . . , 118-N is associated with at least one first database hosted on the at least one first server 112-A, 112-B, . . . , 112-N. For example, the first geo-redundant operator 118-A may be associated with the first servers 112A and 112B.

At operation 504 of the method 500, stateful data is synchronized from of the at least one first database 114-A, 114-B, . . . , 114-N to a corresponding second database 134-A, 134-B, . . . , 134-N associated with the at least one second servers 132-A, 132-B, . . . , 132-N based on the state information, the health information, and one or more synchronization parameters. Synchronizing of the stateful data between the at least one first database 114-A, 114-B, . . . , 114-N and the at least one second database 134-A, 134-B, . . . , 134-N has been explained with reference to FIGS. 3 and 4A-4B and is not repeated herein for the sake of brevity. In an embodiment, the at least first geo-redundant operator 118-A, 118-B, . . . , 118-N send a notification to the corresponding first manager 116-A, 116-B, . . . , 116-N based on the synchronizing of the stateful data. The notification is one of: a successful synchronization, and a failed synchronization.

The sequence of operations of the methods 500 need not be necessarily executed in the same order as they are presented. Further, one or more operations may be grouped together and performed in form of a single step, or one operation may have several sub-steps that may be performed in parallel or in sequential manner.

The disclosed method with reference to FIG. 5, or one or more operations of the method 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

Figure 6:
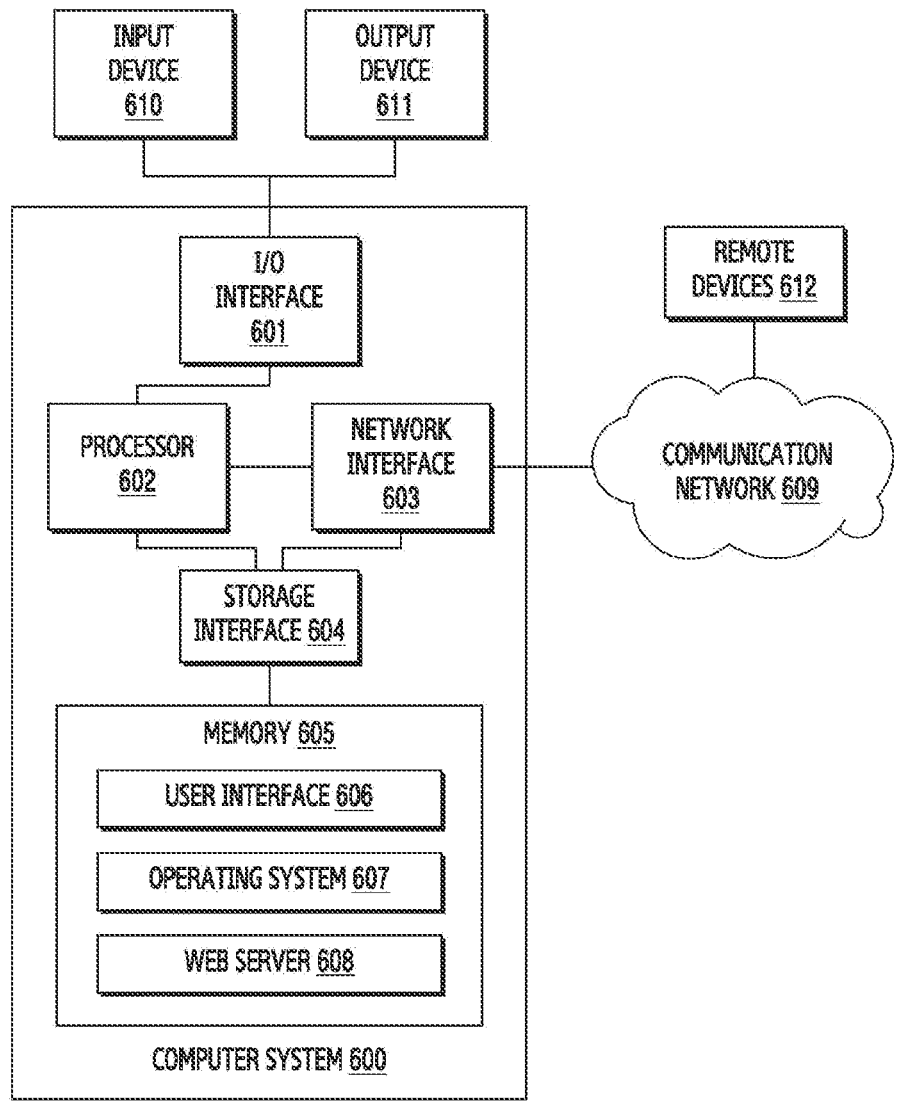
FIG. 6 is a block diagram illustrating an example configuration of a general-purpose computer for managing geo-redundant cloud servers, according to various embodiments.

FIG. 6 is a block diagram illustrating an example configuration of a general-purpose computer for managing geo-redundant cloud servers, according to various embodiments. The computer system 600 may comprise a processor (e.g., including processing circuitry) ("CPU" or "processor") 602. The processor 602 may comprise at least one data processor. The processor 602 may include specialized processing units such as integrated system (bus) controllers, memory management control units, floating point units, graphics processing units, digital signal processing units, etc. The computer system 600 may be analogous to the geo-redundant operator 200 (shown in FIG. 2). The processor 602 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions The processor 602 may be disposed in communication with one or more input/output (I/O) devices (not shown) via I/O interface 601. The I/O interface 601 may include various circuitry and employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In various embodiments, the computer system 600 is connected to the remote devices 612 through a communication network 609. The remote devices 612 may be the second data system 130 or in various embodiments, the other servers of the first data system 110 implemented in a different cloud. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with the remote devices 612. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In various embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web server 608, etc. In various embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In various embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBER FLASH™, JAVASCRIPT™, JAVA™, Application Programming Interfaces (APIs), etc. In various embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In various embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with various embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

Various embodiments of the present disclosure provide numerous advantages. Embodiments of the present disclosure support disaster recovery of distributed, micro services with help of different geo-redundant operators which are utilized to sync various types of stateful data individually. For example, the transfer of different storage type stateful data from the first data system 110 to the second data system 130 is based on the one or more synchronization parameters which are customizable. In general, customization options facilitate synchronizing of specific data type, specific storage type, and at specific time intervals. In addition, the framework supports easy addition of new storage type of stateful data. Moreover, the set of first geo-redundant operators 118-A, 118-B, . . . , 118-N are configured to disable or enable of certain type of stateful data/application specific/customer filter specific type for synchronization between the set of first databases 114-A, 114-B, . . . 114-N and the set of second databases 134-A, 134-B, . . . , 134-N. More specifically, geo-redundancy awareness of the geo-redundant operators to micro service based cloud orchestrator increase efficiency with less or no downtime. This also ensures that the geo-redundancy aware cloud servers quickly recover from disasters using effective utilization of resources due to periodic synchronizing of different storage type stateful data from the first data system 110 to the second data system 130. Further, loose coupling between sub-systems (e.g., at least one first server 112-A, 112-B, . . . , 112-N) not only facilitate effective and efficient switchover but also enable efficient usage of the resources in both the first data system 110 and the second data system 130. This ensures that even if one server (e.g., first server 112-A) in the first data system 110 fails, corresponding second server (132-A) from the second data system 130 switches to perform role of the operational server. As such, the other first servers in the first data system 110 (e.g., first servers 112-B, . . . , 112-N) are still utilized while the first server 112-A that failed alone is replaced by the second server 132-A. Such efficient switching and synchronizing mechanisms are made possible by the geo-redundancy awareness of the set of first geo-redundant operators. Furthermore, in various embodiments, the geo-redundant operators automatically initiates upgradation of applications on identifying any mismatch in applications between the first data system 110 and the second data system 130.

According to embodiments, a method for managing geo-redundant cloud servers may comprises receiving, by at least one first geo-redundant operator associated with at least one first server, state information of the at least one first server, including health information of a corresponding at least one second server. The method may comprise synchronizing, by the at least one first geo-redundant operator, stateful data from at least one first database associated with the at least one first server to a corresponding second database associated with the at least one second server based on the state information, the health information and one or more synchronization parameters.

In an embodiment, the state information of the at least one first server may include one of: an operational server, and a redundant server.

In an embodiment, the health information of the at least one second server may comprise heartbeat information from the at least one second server.

In an embodiment, the at least one first geo-redundant operator may be associated with the at least one first database hosted on of the at least one first server.

In an embodiment, the method may comprise sending, by the at least one first geo-redundant operator, a notification to at least one first manager associated with the at least one first server based on the synchronizing of the stateful data. The notification may include one of: a successful synchronization, and a failed synchronization.

In an embodiment, the method may comprise monitoring, by the at least one first geo-redundant operator, a geo-redundancy status associated with the at least one first server from a corresponding first manager of the set of first managers. The synchronizing of the stateful data may be stopped based on the geo-redundancy status associated with the corresponding first sever being disabled.

In an embodiment, the synchronizing the stateful data may comprise retrieving, by the at least one first geo-redundant operator, the stateful data from the at least one first database. The synchronizing the stateful data may comprise transferring, by the at least one first geo-redundant operator, the stateful data to corresponding second geo-redundant operator. The corresponding second geo-redundant operator may store the stateful data in the at least one second database.

In an embodiment, the transferring the stateful data may comprise sending, by the at least one first geo-redundant operator, a data request to a corresponding second geo-redundant operator for information related to the stateful data stored in the corresponding second database. The transferring the stateful data may comprise receiving, by the at least one first geo-redundant operator, the second information related to the stateful data from the corresponding second geo-redundant operator. The transferring the stateful data may comprise comparing, by the at least one first geo-redundant operator, first information related to the stateful data stored in the first database with the second information to determine difference data. The transferring the stateful data may comprise transferring, by the at least one first geo-redundant operator, stateful data to the corresponding second geo-redundant operator based on the difference data for storing in the corresponding second database based on determining unavailability of the difference data in the corresponding second database based on the comparing.

In an embodiment, the difference data may be deleted from the corresponding second database based on the difference data being unavailable with the at least one first database based on the comparing.

In an embodiment, the one or more synchronization parameters may comprise: a synchronization time, one or more data types, a synchronization priority and a synchronization indicator.

According to embodiments, a first geo-redundant operator configured to manage geo-redundant cloud servers, may comprises a communication interface, comprising communication circuitry, communicably coupled to a first manager associated with a first server and a first database hosted on the first server of a set of first servers in a first data system. The first geo-redundant operator may comprise a memory configured to store instructions. The first geo-redundant operator may comprise at least one processor, comprising processing circuitry, communicably coupled to the communication interface and the memory. At least one processor, individually and/or collectively, is configured to receive state information of the first server, health information of a corresponding second server of a set of second servers of a second data system, from the first manager associated with the first server. At least one processor, individually and/or collectively, is configured to synchronize stateful data from the first database to a corresponding second database associated with the corresponding second server based on the state information, the health information and one or more synchronization parameters.

In an embodiment, the first set of servers and the second set of servers may comprise: a plurality of cloud native stateless services and a plurality of cloud native stateful services.

In an embodiment, the state information of the corresponding second server may include one of: an operational server, and a redundant server.

In an embodiment, the health information of the corresponding second server may comprise at least heartbeat information.

In an embodiment, at least one processor, individually and/or collectively, is configured to send a notification to the corresponding first manager of the set of first managers based on the synchronizing of the stateful data. The notification may include one of: a successful synchronization, and a failed synchronization.

In an embodiment, at least one processor, individually and/or collectively, may be configured to monitor a geo-redundancy status associated with the first server from the first manager. The synchronizing of the stateful data may be stopped based on the geo-redundancy status being disabled.

In an embodiment, for synchronizing the stateful data, at least one processor, individually and/or collectively, may be configured to retrieve the stateful data from the first database. At least one processor, individually and/or collectively, may be configured to transfer the stateful data to a corresponding second geo-redundant operator. The corresponding second geo-redundant operator may store the stateful data in the corresponding second database.

In an embodiment, to transfer the stateful data, at least one processor, individually and/or collectively, may be configured to send a data request to a corresponding second geo-redundant operator for information related to the stateful data stored in the corresponding second database. At least one processor, individually and/or collectively, may be configured to receive the second information related to the stateful data from the corresponding second geo-redundant operator. At least one processor, individually and/or collectively, may be configured to compare first information related to the stateful data stored in the first database with the second information to determine difference data. At least one processor, individually and/or collectively, may be configured to transfer stateful data to the corresponding second geo-redundant operator based on the difference data for storing in the corresponding second database based on determining unavailability of the difference data in the corresponding second database based on the comparing.

In an embodiment, the difference data may be deleted from the second database based on the difference data being unavailable with the corresponding first database based on the comparing.

In an embodiment, the one or more synchronization parameters may comprise a synchronization time, one or more data types, a synchronization priority and a synchronization indicator.

In an embodiment, the first database and the second database may include at least one of: a relational database, a time series database, a file type storage, a block type storage, an object type storage, NoSQL database, and a persistent volume.

According to embodiments, a method performed by a first geo-redundant operator in a first cloud orchestrator, for managing geo-redundant cloud servers, may comprise receiving state information of a first server associated with a microservice in the first cloud orchestrator and health information of a second server associated with the microservice in a second cloud orchestrator. The method may comprise synchronizing stateful data from a first database associated with the first server to a second database associated with the second server based on the state information, the health information, and one or more synchronization parameters. The state information may indicate an operational server from among the operational server and a geo-redundant server.

In an embodiment, the first cloud orchestrator may comprise microservices including the microservice at an operational site. The second cloud orchestrator may comprise the microservices including the microservice at a geo-redundant site. The first server may comprise a network component for the microservice at the operational site. The second server may comprise a network component for the microservice at the geo-redundant site.

In an embodiment, the health information of the second server may comprise heartbeat information from the second server.

In an embodiment, the first geo-redundant operator may be associated with the first database hosted on the first server.

In an embodiment, the method may comprise sending a notification to a first manager associated with the first server based on the synchronizing of the stateful data. The notification may include one of a successful synchronization and a failed synchronization.

In an embodiment, the method may comprise monitoring a geo-redundancy status associated with the first server from a first manager of a set of first managers. The synchronizing of the stateful data may be stopped based on the geo-redundancy status associated with the first sever being disabled.

In an embodiment, the synchronizing the stateful data may comprise retrieving the stateful data from the first database. The synchronizing the stateful data may comprise transferring the stateful data to a second geo-redundant operator associated with the second server. The second geo-redundant operator may store the stateful data in the second database.

In an embodiment, the transferring the stateful data may comprise sending a data request to the second geo-redundant operator for information related to the stateful data stored in the second database. The transferring the stateful data may comprise receiving second information related to the stateful data from the second geo-redundant operator. The transferring the stateful data may comprise comparing first information related to the stateful data stored in the first database with the second information to determine difference data. The transferring the stateful data may comprise transferring the stateful data to the second geo-redundant operator based on the difference data for storing in the second database based on determining unavailability of the difference data in the second database based on the comparing.

In an embodiment, the difference data may be deleted from the second database based on the difference data being unavailable with the first database based on the comparing.

In an embodiment, the one or more synchronization parameters may comprise a synchronization time, one or more data types, a synchronization priority, and a synchronization indicator.

According to embodiments, in a first cloud orchestrator, configured to manage geo-redundant cloud servers, may comprise a communication interface, comprising communication circuitry, communicably coupled to a first manager associated with a first server and a first database hosted on the first server of a set of first servers in a first data system. The first geo-redundant operator may comprise memory configured to store instructions. The first geo-redundant operator may comprise at least one processor comprising processing circuitry. The instructions, when executed by the at least one processor individually and/or collectively, may cause the first geo-redundant operator to receive state information of the first server associated with a microservice in the first cloud orchestrator and health information of a second server associated with the microservice in a second cloud orchestrator. The instructions, when executed by the at least one processor individually and/or collectively, may cause the first geo-redundant operator to synchronize stateful data from the first database to a second database associated with the second server based on the state information, the health information, and one or more synchronization parameters. The state information may indicate an operational server from among the operational server and a geo-redundant server.

In an embodiment, the first set of servers and the second set of servers may comprise a plurality of cloud native stateless services and a plurality of cloud native stateful services.

In an embodiment, the first cloud orchestrator may comprise microservices including the microservice at an operational site. The second cloud orchestrator may comprise the microservices including the microservice at a geo-redundant site. The first server may comprise a network component for the microservice at the operational site. The second server may comprise a network component for the microservice at the geo-redundant site.

In an embodiment, the health information of the corresponding second server may comprise at least heartbeat information.

In an embodiment, the instructions, when executed by the at least one processor individually and/or collectively, may cause the first geo-redundant operator to send a notification to the first manager of a set of first managers based on the synchronizing of the stateful data. The notification may include one of a successful synchronization and a failed synchronization.

In an embodiment, the instructions, when executed by the at least one processor individually and/or collectively, may cause the first geo-redundant operator to monitor a geo-redundancy status associated with the first server from the first manager. The synchronizing of the stateful data may be stopped based on the geo-redundancy status associated with the first server being disabled.

In an embodiment, the instructions, when executed by the at least one processor individually and/or collectively, may cause the first geo-redundant operator for synchronizing the stateful data to retrieve the stateful data from the first database. The instructions, when executed by the at least one processor individually and/or collectively, may cause the first geo-redundant operator for synchronizing the stateful data to transfer the stateful data to a second geo-redundant operator associated with the second server. The second geo-redundant operator may store the stateful data in the second database.

In an embodiment, the instructions, when executed by the at least one processor individually and/or collectively, may cause the first geo-redundant operator to send a data request to the second geo-redundant operator for information related to the stateful data stored in the second database. The instructions, when executed by the at least one processor individually and/or collectively, may cause the first geo-redundant operator to receive second information related to the stateful data from the second geo-redundant operator. The instructions, when executed by the at least one processor individually and/or collectively, may cause the first geo-redundant operator to compare first information related to the stateful data stored in the first database with the second information to determine difference data. The instructions, when executed by the at least one processor individually and/or collectively, may cause the first geo-redundant operator to transfer the stateful data to the second geo-redundant operator based on the difference data for storing in the second database based on determining unavailability of the difference data in the second database based on the comparing.

In an embodiment, the difference data may be deleted from the second database based on the difference data being unavailable with the first database based on the comparing.

In an embodiment, the one or more synchronization parameters may comprise a synchronization time, one or more data types, a synchronization priority, and a synchronization indicator.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detailed description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to embodiments containing only one such recitation, even when the introductory phrases "one or more" or "at least one" and indefinite articles such as "a" or "an" (e.g., "a" and/or "an" may refer, for example, to "at least one" or "one or more") are included in the recitations; the same holds true for the use of definite articles used to introduce such recitations. In addition, even if a specific part of the introduced description recitation is explicitly recited, those skilled in the art will recognize that such recitation may refer, for example, to at least the recited number (e.g., the bare recitation of "two recitations," without other modifiers, may refer, for example, to at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the detailed description including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means".

What is claimed is:

1. A method performed by a first geo-redundant operator of an operational server in a first cloud orchestrator managing geo-redundant cloud servers, the method comprising:
   receiving state information of the operational server managed by the first cloud orchestrator and health information of a geo-redundant server managed by a second cloud orchestrator;
   based on the state information and the health information, identifying difference data at least by comparing first stateful data which is mapped to the first geo-redundant operator and is stored in the operational server with second stateful data which is mapped to the first geo-redundant operator and is stored in the geo-redundant server;
   identifying a server corresponding to the difference data from among the operational server and the geo-redundant server; and
   in a case that the server corresponding to the difference data is the operational server, synchronizing stateful data from the operational server to the geo-redundant server, at least by transmitting the difference data to the geo-redundant server.

2. The method of claim 1, wherein the first cloud orchestrator comprises first microservices at an operational site,
   wherein the second cloud orchestrator comprises second microservices at a geo-redundant site,
   wherein the operational server comprises a network component for one or more of the first microservices at the operational site, and
   wherein the geo-redundant server comprises a network component for one or more of the second microservices at the geo-redundant site.

3. The method of claim 1, wherein the health information of the geo-redundant server comprises heartbeat information from the geo-redundant server.

4. The method of claim 1, wherein the first geo-redundant operator is associated with a first database hosted on the operational server.

5. The method of claim 1, further comprising:
   sending a notification to a first manager of the operational server based on the synchronizing of the stateful data,
   wherein the notification includes one of a successful synchronization and a failed synchronization.

6. The method of claim 1, further comprising:
   monitoring a geo-redundancy status associated with the operational server using a first manager of the operational server,
   wherein the synchronizing of the stateful data is stopped based on the geo-redundancy status associated with the operational server being disabled.

7. The method of claim 1, wherein synchronizing the stateful data comprises:
   transmitting the difference data to a second geo-redundant operator of the geo-redundant server,
   wherein the second geo-redundant operator stores the difference data in a second database of the geo-redundant server.

8. The method of claim 1, further comprising:
   in a case that the server corresponding to the difference data is the geo-redundant server, causing the geo-redundant server to delete the difference data.

9. The method of claim 1, comprising:
   based on one or more synchronization parameters, identifying the difference data, wherein the one or more synchronization parameters comprises a synchronization time, one or more data types, a synchronization priority, and a synchronization indicator.

10. A first geo-redundant operator of an operational server in a first cloud orchestrator configured to manage geo-redundant cloud servers, comprising:
    a communication interface comprising communication circuitry;
    memory storing instructions; and
    at least one processor comprising processing circuitry,
    wherein the instructions, when executed by the at least one processor individually and/or collectively, cause the first geo-redundant operator to:
    receive state information of the operational server managed by the first cloud orchestrator and health information of a geo-redundant server managed by a second cloud orchestrator;
    based on the state information and the health information, identify difference data by comparing first stateful data which is mapped to the first geo-redundant operator and is stored in the operational server with second stateful data which is mapped to the first geo-redundant operator and is stored in the geo-redundant server;
    identify a server corresponding to the difference data from among the operational server and the geo-redundant server; and
    in a case that the server corresponding to the difference data is the operational server, synchronize stateful data from the operational server to the geo-redundant server, by transmitting the difference data to the geo-redundant server.

11. The first geo-redundant operator of claim 10, wherein the first cloud orchestrator comprises first microservices at an operational site,
    wherein the second cloud orchestrator comprises second microservices at a geo-redundant site,
    wherein the operational server comprises a network component for one or more of the first microservices at the operational site, and
    wherein the geo-redundant server comprises a network component for one or more of second the microservices at the geo-redundant site.

12. The first geo-redundant operator of claim 10, wherein the health information of the geo-redundant server comprises heartbeat information from the geo-redundant server.

13. The first geo-redundant operator of claim 10, wherein the first geo-redundant operator is associated with a first database hosted on the operational server.

14. The first geo-redundant operator of claim 10, wherein the instructions, when executed by the at least one processor individually and/or collectively, cause the first geo-redundant operator to:
    send a notification to a first manager of the operational server based on the synchronizing of the stateful data,
    wherein the notification includes one of a successful synchronization and a failed synchronization.

15. The first geo-redundant operator of claim 10, wherein the instructions, when executed by the at least one processor individually and/or collectively, cause the first geo-redundant operator to:
    monitor a geo-redundancy status associated with the operational server using a first manager of the operational server,
    wherein the synchronizing of the stateful data is stopped based on the geo-redundancy status associated with the operational server being disabled.

16. The first geo-redundant operator of claim 10, wherein the instructions, when executed by the at least one processor individually and/or collectively, cause the first geo-redundant operator for synchronizing the stateful data to:
  transmit the difference data to a second geo-redundant operator of the geo-redundant server, and
  wherein the second geo-redundant operator stores the difference data in a second database of the geo-redundant server.

17. The first geo-redundant operator of claim 10, wherein the instructions, when executed by the at least one processor individually and/or collectively, cause the first geo-redundant operator to: in a case that the server corresponding to the difference data is the geo-redundant server, cause the geo-redundant server to delete the difference data.

18. The first geo-redundant operator of claim 10, wherein the instructions, when executed by the at least one processor individually and/or collectively, cause the first geo-redundant operator to:
  based on one or more synchronization parameters, identify the difference data,
  wherein the one or more synchronization parameters comprises a synchronization time, one or more data types, a synchronization priority, and a synchronization indicator.

* * * * *